United States Patent [19]

Adams

[11] Patent Number: 5,318,262
[45] Date of Patent: Jun. 7, 1994

[54] MULTIPLE LAYER SUCTION HOLDER

[75] Inventor: William E. Adams, Portersville, Pa.

[73] Assignee: Adams Mfg. Corp., Portersville, Pa.

[21] Appl. No.: 982,588

[22] Filed: Nov. 27, 1992

[51] Int. Cl.$^5$ ............................................. A45D 42/14
[52] U.S. Cl. ................................... 248/205.8; 248/363; 248/903
[58] Field of Search ............... 248/205.5, 205.6, 205.7, 248/205.8, 205.9, 206.1, 206.2, 363, 683, 362, 903

[56] References Cited

U.S. PATENT DOCUMENTS

| | | | |
|---|---|---|---|
| 3,310,267 | 3/1967 | Koehler | 248/205.5 X |
| 3,750,991 | 8/1973 | Ragir | 248/205.8 |
| 4,813,640 | 3/1989 | Perentin | 248/205.8 |
| 5,029,786 | 7/1991 | Wu | 248/205.7 |
| 5,104,077 | 4/1992 | Liu | 248/205.8 |
| 5,176,346 | 1/1993 | Liu | 248/206.1 |

FOREIGN PATENT DOCUMENTS 0608281  9/1960  Italy ........................... 248/205.7

*Primary Examiner*—Ramon O. Ramirez
*Attorney, Agent, or Firm*—Buchanan Ingersoll; Lynn J. Alstadt

[57] ABSTRACT

A multiple layer suction holder is disclosed in which a lower attaching layer is made of a soft, flexible material having a neck extending therefrom. A shell is fitted on top of the lower attaching layer where the shell is made from a flexible material which is harder than the soft, flexible material of the lower attaching layer. The suction holder is further provided with connecting devices which force the shell against the lower attaching layer in order to provide an internal pressure in the lower attaching layer directed toward the mounting surface. Hence, air cannot readily pass under the lower attaching layer. The multiple layer suction holder provides maximum contact with the mounting surface and maximum memory that results in longer life of the suction holder.

43 Claims, 4 Drawing Sheets

MULTIPLE LAYER SUCTION HOLDER

FIELD OF THE INVENTION

The present invention relates to suction holders which rely on atmospheric pressure to hold them against a mounting surface. More particularly, the present invention relates to a multiple layer suction holder providing maximum memory for improved surface contact, longer life and reduced cost.

BACKGROUND OF THE INVENTION

Suction cups are generally comprised of a cup portion with a neck extending therefrom. The cup portion has an external convex surface and an internal concave gripping surface which is pressed against a window or other clean, smooth mounting surface for attachment thereto. When the suction cup is pressed against the mounting surface, air is forced from under the concave gripping surface. As the cup portion tries to return to its original shape, a vacuum is created which holds the suction cup against the mounting surface.

Usually suction cups are formed in a mold from a soft, pliable material such as rubber, PVC or various soft plastics having a durometer of 50 to 75. Suction cups made from these plastics work well, but have limited memory. After adhering to a mounting surface for a period of time, particularly a window exposed to light, the suction cups lose their memory and flatten out. When a suction cup has flattened out, there is little or no internal tension to hold the cup against the window. Because of this lack of memory in the perimeter of the suction cup, the perimeter of the suction cup tends to curl back. That allows air to enter the vacuum between the cup and the glass, causing the cup to release from the mounting surface. Such a loss of memory prevents reuse and the cup must be discarded.

Another conventional suction cup comprises a cup portion, a second layer which fits over the cup portion and a mechanism which when activated pulls the center of the suction cup away from the mounting surface toward the second layer in order to increase the degree of suction. The utilization of this mechanism makes this suction cup a complex and relatively expensive structure. Thus, there is a need for a suction cup which retains its memory longer and, therefore, has a longer period of use. Such a product should also be relatively inexpensive.

BRIEF SUMMARY OF THE INVENTION

I provide a multiple layer suction holder including a lower attaching layer, a shell and connecting means for joining the lower attaching layer to the shell and creating improved surface contact between the suction holder and the mounting surface.

The lower attaching layer is made of soft, pliable material such as PVC. The material should generally have a durometer of not more than 75 and be as smooth and free of microscopic irregularities as possible. The lower attaching layer can be formed by injection molding. However, when the lower attaching layer has a durometer of 50 or less, injection molding is difficult. When materials with 50 durometers or less are utilized, calendar forming is preferred because with calendar forming smooth finishes can be obtained. Also, calendaring is a relatively inexpensive process. A sheet of plastic with a smooth finish is produced via calendar forming. The lower attaching layer of the present invent is then stamped from this sheet.

The shell is made from a thin, flexible plastic material which is harder and has a greater memory than the lower attaching layer material. The shell fits over the lower attaching layer and is connected to the lower attaching layer by connecting means which forces the shell against the lower attaching layer creating a pressure around the perimeter of the lower attaching layer in the direction of the mounting surface. This results in increased surface contact between the suction holder and the mounting surface. The pressure creates a seal between the perimeter of the lower attaching layer and the mounting surface which prevents air from getting under the lower attaching layer. Consequently, the lower attaching layer remains engaged with the mounting surface for a longer period.

By providing a multiple layer suction holder having a shell with greater memory than the lower attaching layer, I ensure both maximum surface contact as well as maximum memory for reuse along with possible reduced cost in material. The shell increases the memory of the suction holder without hindering the flexibility of the lower attaching layer allowing the suction holder to be mountable on various contoured surfaces. The more of the lower attaching layer that contacts the mounting surface, the more friction there is between the suction holder and the mounting surface thus allowing a smaller suction holder to carry more weight. The shape of the shell dictates the extent to which the lower attached portion engages the mounting surface. The shell may be flat or concave and may have an elevated rim along the shell perimeter which engages the lower attaching layer.

Varying degrees of concavity may be provided, both in the shell and lower attaching layer. By providing a flat shell for engaging the lower attaching layer, the overall surface contact between the attaching portion and mounting surface will be increased. However, when a concave or truncated shell is employed, the shell primarily contacts the lower attaching layer at its circumference and a circular surface contact between the lower attaching layer and mounting surface results.

An elevated rim positioned along the perimeter of the shell surface which engages the lower attaching layer increases the force of the shell against the lower attaching layer.

For some uses an adjustable shell may be used which may be twisted or adjusted to provide a greater vacuum between the mounting surface and the lower attaching layer.

A suction holder having more than two layers could be provided. A third caulk layer can be added to the lower attaching layer in order to create a seal between the lower attaching layer and the mounting surface. This seal will not only prevent air from getting under the lower attaching layer but will also keep fluids and other debris from under the lower attaching layer. Also, multiple shell members may be combined with the lower attaching layer and primary shell to give an increased memory when it is necessary for the suction holder to support a large amount of weight. Contrasting colored shells may be used which have visible through holes to indicate the degree of memory contributed by each shell. The shells may further take the form of decorative shells that combine for an aesthetic appearance.

I provide several means for connecting the shell with the lower attaching layer that will create maximum surface contact and increased memory of the suction holder thus, preventing separation of the suction holder from the mounting surface.

One embodiment of connecting means includes nubs or projections positioned along the neck of the lower attaching layer which forces the shell against the lower attaching layer resulting in a maximum surface contact between the lower attaching layer and the mounting surface.

Threads or annular rings can alternatively be provided on the neck portion of the lower attaching layer to connect the lower attaching layer to the shell. The threads or annular rings allow for adjustment of the shell along the neck of the lower attaching layer. The more of the shell in contact with the lower attaching layer, the greater the surface contact between the lower attaching layer and the mounting surface to resist downward pressure that causes disengagement of the suction holder.

Yet another possible connection means between the lower attaching layer and shell is an anchor stem which extends from the lower attaching layer and is friction fitted within a cavity in the shell. The anchor stem works in combination with a flexible lip formed on the exterior circumference of the lower attaching layer. The flexible lip receives the circumference of the shell which results in increased surface contact along the lip between the suction holder and the mounting surface.

Another embodiment of the connecting means includes either a wedge or a pin member extending transversely through the neck of the lower attaching layer forcing the shell against the lower attaching layer. The degree of memory and surface contact created can be controlled by the amount of interference between the wedge or the pin and the shell which forces the shell against the lower attaching layer and in turn forces the lower attaching layer against the mounting surface.

Another advantage of my cup is that sunlight passing through the suction holder is diffused rather than focused as occurs with a conventional single layer suction holder. Because the suction holder is comprised of two different plastics, the shell and the attaching portion, light which can harm objects is diffused at the interface of the different plastics so that it will not focus on curtains, furniture or other objects near the window.

I further provide a suction holder which will reduce the amount of what is thought to be toxic material. Heavy metal stabilizers are commonly used to retard degradation of soft, conventional plastics caused by sunlight. My multiple layer suction holder with better memory and thus, a longer life results in a reduced demand for suction holders which in turn reduces the amount of heavy metal stabilizers to be discarded.

My suction cup provides an optional hook located on either the lower attaching layer or shell, preferably on the shell, allowing an object to be hung from the suction holder. Further, a spring arm can be utilized with the hook in order to hold any paper hung from the suction holder hook against the mounting surface preventing the paper from curling at the edges.

As an alternative to the spring arm, I provide the suction holder having a spring gripping section included on the shell portion. Paper can be held by slipping the paper under the spring gripping section.

Other objects and advantages of the invention will become apparent from a description of the present preferred embodiments shown in the accompanying drawings.

BRIEF DESCRIPTION OF THE FIGURES

In the accompanying drawings I have shown certain present preferred embodiments of the invention in which.

DESCRIPTION OF THE PREFERRED EMBODIMENTS

Figure 1:
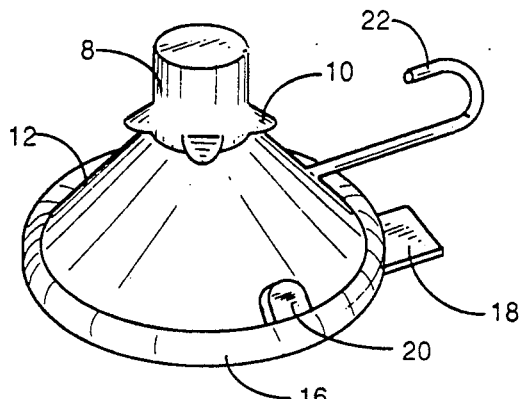
FIG. 1 is a perspective view showing a preferred embodiment of my multiple layer suction holder having an optional hook attached to the shell.
Figure 2:
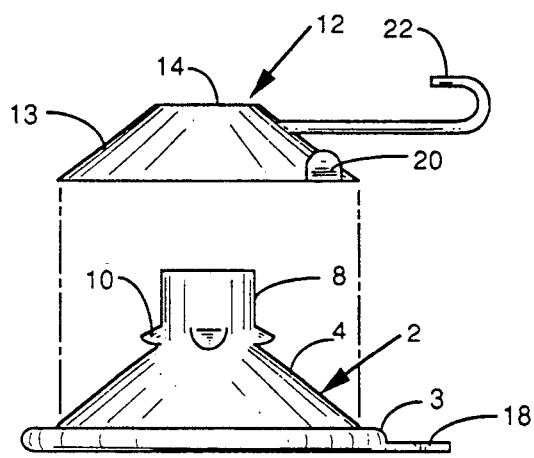
FIG. 2 is an exploded view of the suction holder of FIG. 1 showing the shell removed from the suction holder.
Figure 3:
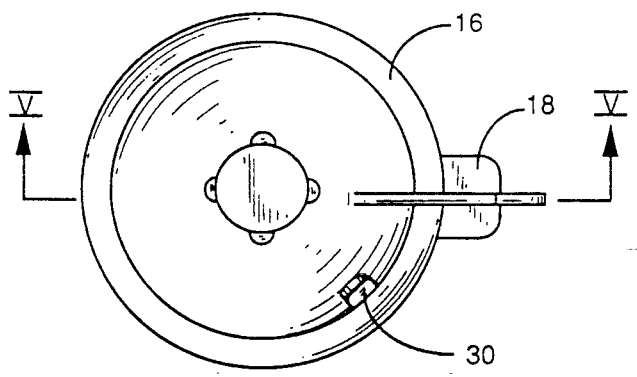
FIG. 3 is a top view of the suction holder of FIG. 1.
Figure 4:
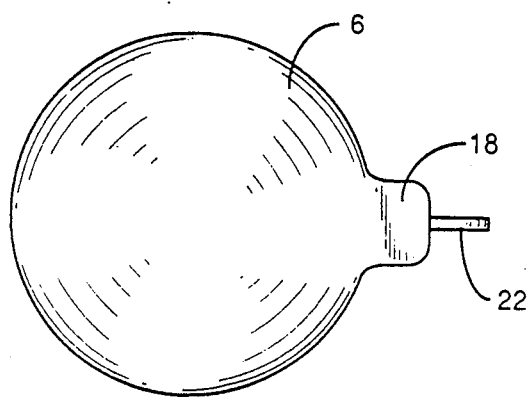
FIG. 4 is a bottom view of the suction holder of FIG. 1.
Figure 5:
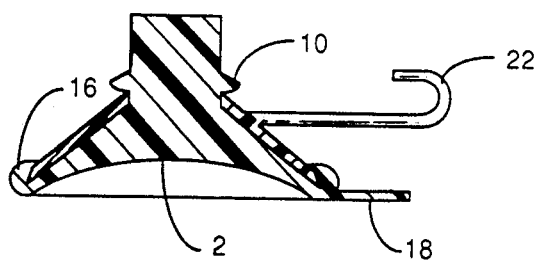
FIG. 5 is a cross-sectional view taken along lines V—V of FIG. 3.
Figure 6:
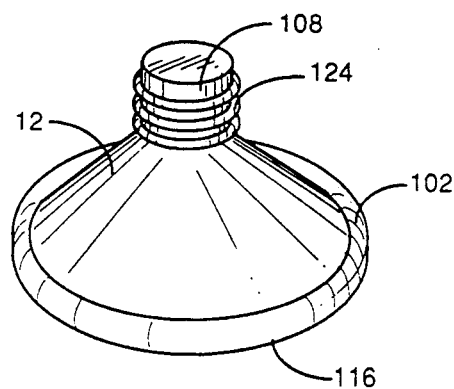
FIG. 6 is a perspective view of a second preferred embodiment of my multiple layer suction holder.

Referring to FIGS. 1 through 5, my suction holder includes a lower attaching layer 2 having a convex top surface 4 and concave bottom surface 6. A cylindrical neck 8 extends from the center of the convex top surface 4. I prefer to provide nubs or projections 10 on the neck portion 8. A lip 16 is positioned on the circumference 3 of the lower attaching layer 2 to receive the circumference 13 of a shell 12.

The lower attaching layer 2 and neck portion 8 can be injection molded as one piece from materials having a durometer of not more than 75 such as rubber or polyvinyl chloride. However, other more soft and flexible materials having a durometer of 50 or less are desired in the instance where greater flexibility is needed to engage an unusual contoured mounting surface. Materials having a durometer of less than 50 are difficult to mold. Calendar forming which can provide a smooth finished sheet of plastic could be utilized to produce the lower attaching layer 2 having a durometer of less than 50. Once the sheet of plastic is formed by calendar forming, the lower attaching layer can be stamped therefrom.

Softer durometer material (below 50-55) tends to fill voids in surfaces when pressed against those surfaces. This multi-layer suction cup with a very soft (20-50 durometer) lower layer would form and maintain a vacuum on more porous surfaces such as some painted or enameled surfaces, as well as metal and other surfaces to which suction cups would not ordinarily stick.

A caulk-like material could also be used beneath the harder, better-memory outer shell that would be formed and hold a vacuum beneath it. It could be attached to the outer shell(s) by being forced through holes or screening which would hold it in place. It could be made so that it would form a vacuum between itself, the shell above it, and the surface beneath it, and be designed so that it was self-sealing to both these surfaces.

I provide a truncated shell 12 which fits on top of the lower attaching layer 2 and engages the convex top surface 4 of the lower attaching layer 2. The shell 12 has an opening 14 through which the neck portion 8 having nubs or projections 10 extends. The projections 10 on the neck portion 8 engage the shell 12 forcing the shell 12 against the convex top surface 4 and lip 16 thus creating pressure along the lip 16 of the lower attaching layer 2. This pressure along the lip 16 of the lower attaching layer 2 creates increased surface contact with the mounting surface preventing air from getting under the lower attaching layer 2 and causing the suction holder from disengaging from the mounting surface. The positioning of the nubs or projections 10 along the neck 8 dictates the amount of force applied by the shell against the lower attaching layer 2 and thus, the amount of surface contact between the lower attaching layer 2, and the mounting surface. The more surface contact, the more friction between the lower attaching layer 2 and the mounting surface, and the more weight the suction holder can support. The number of nubs or projections 10 located on the neck portion 8 varies depending on the amount of weight that needs to be supported by the suction holder.

The shell 12 should be made of a material harder than the lower attaching layer 2 material. I prefer to use polycarbonate because of its memory, clarity and strength. Because the shell 12 and lower attaching layer 2 are made of different materials, light passing through the lower attaching layer 2 will be diffused at the interface between the lower attaching layer 2 and the shell 12. Hence, sunlight passing through a window-mounted suction holder will tend not to focus on and harm curtains, furniture or other objects located near the window.

I prefer to provide a tab 18 as seen in FIGS. 1-5 extending from the lip 16 of the lower attaching layer 2. If desired, one could also provide a tab 18 on the shell 12. I further provide a hook 22 on the shell 12 which allows an object to be hung from the suction holder.

Alternative embodiments are shown in FIGS. 6 through 16 in which like reference numerals indicate parts similar with those above described. In one alternative embodiment shown in FIG. 6, I provide a series of annular rings 124 along the neck portion 108. The annular rings 124 enable me to control the fit of the shell 112 against the lower attaching layer 102 by providing a means of adjustment for the shell along the neck portion 8. The further down the neck portion 108 the shell 112 is positioned, the more the shell 112 forces the lower attaching layer against the mounting surface. The more pressure the shell 112 exerts along the lip 116 of the lower attaching layer 102, the less chance of air readily passing under the lower attaching layer 102. This reduces the chances of the lower attaching layer 102 disengaging from the mounting surface In place of the annular ring 124, threads (not shown) can also be utilized to provide a means of adjustment for the shell 112 along the neck portion 108 of the lower attaching layer 102.

Figure 7:
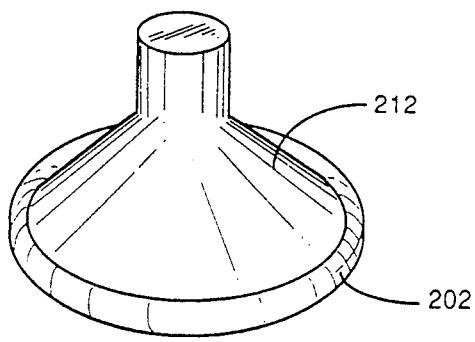
FIG. 7 is a side view of a third preferred embodiment of my multiple layer suction holder.
Figure 8:
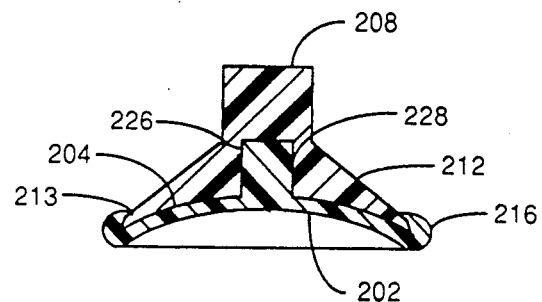
FIG. 8 is a cross-sectional view through the center of FIG. 7.

In yet another embodiment shown in FIGS. 7 and 8, I provide a friction fit anchor stem 226. The neck 208 of the lower attaching layer takes the form of an anchor stem 226 which is friction fit within a cavity 228 located in the bottom center of the shell 212. The shell 212 extends over the convex top surface 204 of the lower attaching layer 202 and neck 208. The circumference 213 of the shell 212 is received by flexible lip 216 of the lower attaching layer 202.

Figure 9:
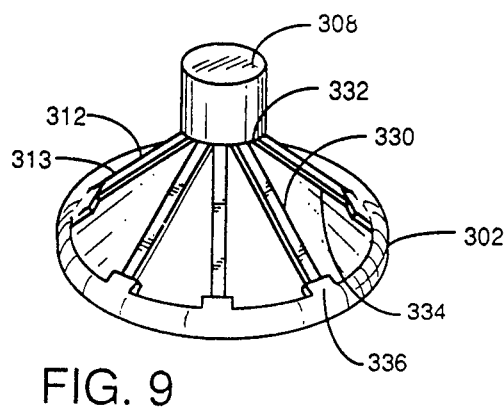
FIG. 9 is a perspective view of a fourth preferred embodiment of my multiple layer suction holder.

In the embodiments of FIGS. 1 through 8 the shell is a truncated cone. One could also make the shell 312 as shown in FIG. 9. This shell 312 is comprised of a series of radial arms 330 which extend from the upper center portion 332 of the shell to the circumference 313 of the shell 312. The radial arms 330 strengthen the shell 312 which increases the overall memory of the suction holder. The distal ends 334 of the radial arms 330 engage protuberances 336 on the outer circumference of the lower attaching layer 302. A lower attaching layer 2 having a flexible lip 16 extending around its circumference, as shown in the embodiment of FIGS. 1 through 5, can also be utilized to engage the radial arms 330 of the shell 312.

The shell and the lower attaching layer could also be made flat, as shown in FIGS. 10 through 13. The lower attaching layer 402 (FIGS. 10 and 11) includes a flat circular base section 438 with tapered edge 439 and having a top surface 440 and a bottom surface 406. The flat base section 438 further includes a neck portion 408 extending from the top surface 404 of the base section 438. The flat shell 412 includes an opening 414 through which the neck portion 408 of the lower attaching layer 402 extends. Because both the shell 412 and the lower attaching layer 402 are flat, they share greater surface contact at their interface than the non flat embodiments of the suction holder shown in FIGS. 1 through 9. The feature of increased surface contact results in the suction holder sharing maximum surface contact with the mounting surface and being able to support greater weight.

Figure 10:
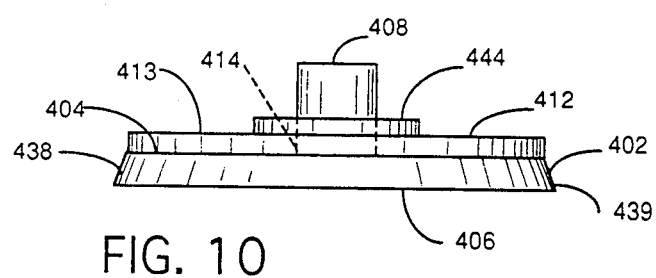
FIG. 10 is a side view of a fifth embodiment of my multiple layer suction holder.
Figure 11:
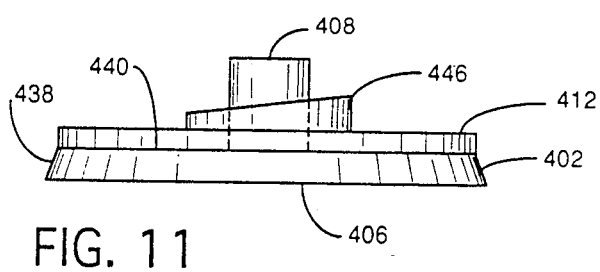
FIG. 11 is a side view showing a sixth embodiment of my multiple layer suction holder.

FIGS. 10 and 11 show another embodiment of connection means for joining the lower attaching layer to the shell. A pin 444 or wedge 446 extends transversely through an aperture or slot in the neck portion 408 and forces the shell 412 against the lower attaching layer 402. The degree of pressure or memory created in the lower attaching layer 402 can be controlled by the amount the wedge 446 or pin 444 contacts the shell 412 and thus, forces the shell 412 against the lower attaching layer 402. It should be noted that pin or wedge connecting means can also be utilized with a suction holder having a non-flat lower attaching layer and non-flat shell.

Figure 12:
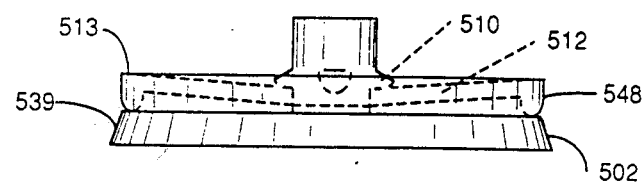
FIG. 12 is a side view of a seventh embodiment of my multiple layer suction holder.

As shown in FIG. 12, shell 512 can have an elevated rim 548 along the perimeter of the shell surface which engages the lower attaching layer 502 in order to further increase memory of the suction holder. By forcing the center of the shell 502 below the projections 510, the circumference 513 of the shell possessing the elevated rim 548 is spring loaded and engages the lower attaching layer 502 with increased pressure. The elevated rim 548 positions the greatest amount of pressure along the circumference of the lower attaching layer 502 thus preventing any air from getting under the lower attaching layer 502 and preventing disengagement of the suction holder from the mounting surface.

The suction holders shown in FIGS. 1 through 12 have only two layers, the lower attaching layer and one shell. However, my suction holder may have more than two layers depending on the amount of weight to be supported by the suction holder. For this type of product I prefer to use one of the two types of layers shown in FIG. 13.

Figure 13:
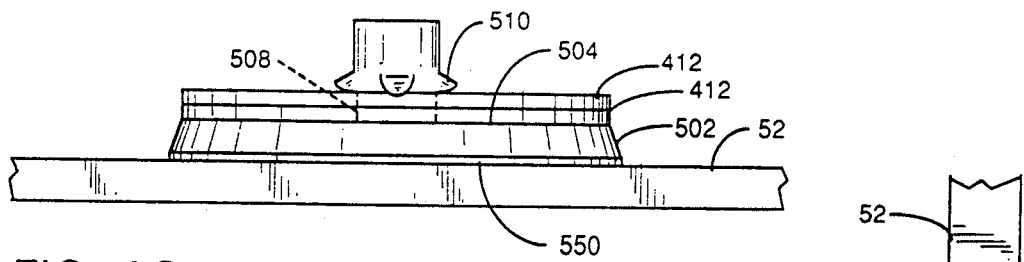
FIG. 13 is a side view of an eighth embodiment of my multiple layer suction holder.

First, multiple shells 412, as seen in FIG. 13, could be added to the lower attaching layer 502 in order to increase the surface contact between the suction holder and the mounting surface 52. Two shells 412 extend over the neck 508 of the lower attaching portion 502 and are held against the lower attaching portions top surface 504 by projections 510. Because the shells 412 are flat, more of their surface contacts the lower attaching portion 502 top surface 504 which results in increased surface contact between the suction holder and the mounting surface 52. The more shells 412 that are employed, the greater the force that is created against the lower attaching layer 502 which results in the suction holder having maximum surface contact and maximum memory. Multiple shells having non-flat configurations, i.e. truncated cones, can also be utilized to increase the surface contact between the suction holder and the mounting surface.

Second, a vinyl or silicone caulk 550, also shown in FIG. 13, could be positioned adjacent the lower attaching layer 502 to create a seal between the mounting surface 52 and the lower attaching layer 502. The caulk 550 prevents any fluids or debris from readily passing under the lower attaching layer 502 and causing the lower attaching layer to disengage from the mounting surface 52.

Figure 14:
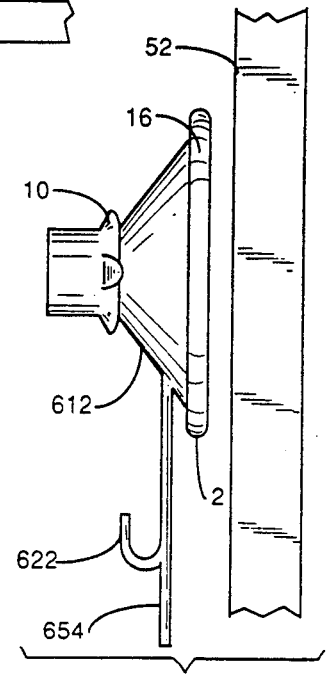
FIG. 14 is a side view showing the multiple layer suction holder having an optional hook and spring arm.

In the case where the suction holder is employed to display a sign, paper or the like, a spring arm 654 acting in conjunction with a hook 622, as shown in FIG. 14, can be utilized in order to hold the sign, paper or the like and prevent the edges of the paper from curling. In the drawing, the hook 622 and spring arm 654 are positioned on the shell 612. But, they may be positioned on the lower attaching layer 2. The paper (not shown) would extend between the spring arm 654 and the mounting surface 52.

Figure 15:
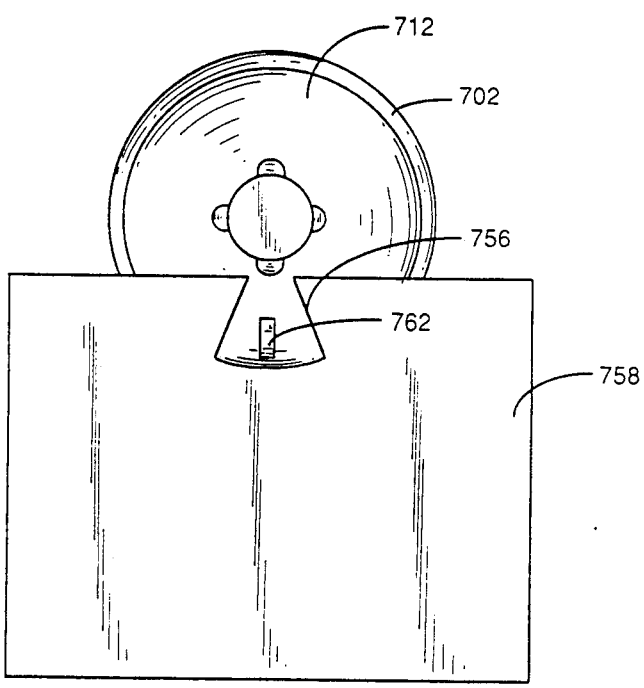
FIG. 15 is a front view of my multiple layer suction holder having an optional spring gripping section.
Figure 16:
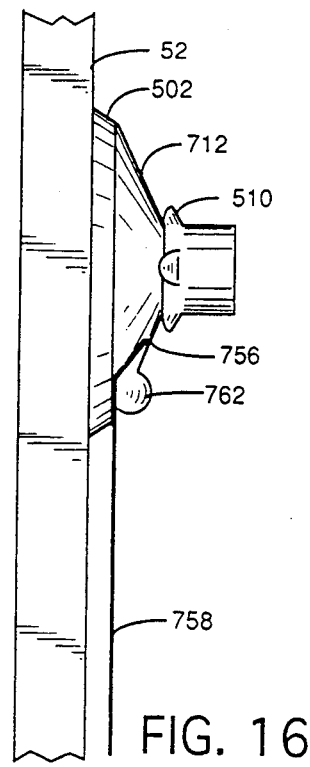
FIG. 16 is a side view of the embodiment of FIG. 15.

As an alternative to the spring arm, I also provide a shell 712 having a spring gripping section 756 which can be utilized to display paper 758 or the like. The shell having the spring gripping section 756 is shown in FIGS. 15 and 16. The spring gripping section 756 is formed by segmenting a portion of the shell 712 and positioning a lift tab 762 on the spring gripping section 756. The spring gripping surface 756 is lifted via the lift tab 762 and the paper 758 is positioned between the spring gripping section 762 and the flat lower attaching layer 702.

It should be noted that the present invention encompasses any of the connecting means described above being utilized with any of the described shell and lower attaching layer configurations. Although the shell and lower attaching layer shown in the figures have generally circular cross-sections, other shapes could also be used. For example, one could make oblong lower attaching layers and shells. Such an oblong suction cup is shown in my U.S. Pat. No. 5,078,356. Furthermore, the truncated shell could be molded with holes in it to provide a decorative appearance. For example, holes could be provided around the opening of the shell in which the holes may be shamrock or heart-shaped.

Although I have shown and described certain present preferred embodiments of my suction holder, it should be understood that the invention is not limited thereto, but may be variously embodied within the scope of the following claims.

I claim:

1. A suction holder comprising:
    a) a lower attaching layer having a bottom surface, a top surface, and a perimeter therebetween, the top surface having a center portion and a neck attached to the center portion of the top surface, the lower attaching layer being made from a soft, flexible material;
    b) at least one shell having a top surface, a bottom surface and a shell perimeter therebetween, the at least one shell fitted on the top surface of the lower attaching layer, the at least one shell being made of a flexible material which is harder than the soft, flexible material of the lower attaching layer;
    c) a lip forming a groove extending entirely along the lower attaching layer perimeter, the at least one shell perimeter being positioned within and surrounded by the groove; and
    d) a fastener being located on the neck, both the lip and the fastener being sized and proportioned such that when the suction holder is attached to a mounting surface a pressure at an angle with respect to a longitudinal axis of the neck is created on the lip which holds the lip in contact with the mounting surface.

2. The suction holder of claim 1 wherein the lower attaching layer and the at least one shell are substantially flat.

3. The suction holder of claim 1 wherein the lower attaching layer material is polyvinyl chloride.

4. The suction holder of claim 1 wherein the fastener is at least two projections attached to the neck for retaining the at least one shell in a desired position.

5. The suction holder of claim 1 wherein the fastener includes annular rings positioned along an exterior surface of the neck.

6. The suction holder of claim 1 wherein the at least one shell includes spring gripping section means for retaining an object between the spring gripping section means and the lower attaching top surface, the spring gripping section means and the lower attaching top surface, the spring gripping section means being an integral segmented portion of the at least one shell.

7. The suction holder of claim 1 wherein the fastener includes an aperture projecting transversely through the neck and one of a pin and a wedge extending through the aperture and engaging the at least one shell.

8. The suction holder of claim 1 also comprising a hook member attached to one of the neck and the at least one shell.

9. The suction holder of claim 8 wherein the hook member further includes a spring arm.

10. The suction holder of claim 1 wherein the at least one shell material is polycarbonate.

11. The suction holder of claim 1 wherein a tab is attached to one of the at least one shell and the lower attaching layer.

12. The suction holder of claim 1 wherein the lower attaching layer and the at least one shell are in the shape of a truncated cone.

13. The suction holder of claim 6 wherein the spring gripping section means includes a lift tab.

14. The suction holder of claim 1 wherein the neck of the lower attaching layer extends through an opening in the at least one shell.

15. The suction holder of claim 1 wherein the lower attaching layer is made from a material with a durometer of less than 50.

16. The suction holder of claim 1 wherein the soft, flexible material of the lower attaching layer has a durometer not greater than 75.

17. The suction holder of claim 15 wherein the lower attaching layer is formed by calendar forming a sheet of the material having a durometer of less than 50; and stamping the lower attaching layer from the sheet of material having a durometer of less than 50.

18. A suction holder comprising:
 a) a lower attaching layer having a bottom surface, a top surface with a center portion and a neck being attached to the center portion of the top surface, the lower attaching layer being made from a soft, flexible material;
 b) at least one shell having a top surface and a bottom surface, the at least one shell fitted on the top surface of the lower attaching layer, the at least one shell being made of a flexible material which is harder than the soft, flexible material of the lower attaching layer;
 c) a third layer attached to the lower attaching layer, the third layer being made of a material softer and more flexible than the lower attaching layer; and
 d) means for connecting the lower attaching layer to the at least one shell and for forcing the bottom surface of the at least one shell against the top surface of the lower attaching layer such that when the suction holder is attached to a mounting surface a pressure is created in the lower attaching layer in a direction opposite the neck.

19. The suction holder of claim 18 wherein the lower attaching layer and the at least one shell are substantially flat.

20. The suction holder of claim 18 wherein the material of the third layer is a silicone caulk.

21. The suction holder of claim 18 wherein the neck of the lower attaching layer extends through an opening in the at least one shell.

22. The suction holder of claim 18 wherein the connecting means includes annular rings positioned along an exterior surface of the neck.

23. The suction holder of claim 18 wherein the connecting means further comprises an elevated rim positioned on the bottom surface of the at least one shell along the circumference of the at least one shell.

24. The suction holder of claim 18 wherein the connecting means includes at least two projections attached to the neck for retaining the at least one shell in a desired position.

25. A suction holder comprising:
 a) a lower attaching layer having a bottom surface, a top surface with a center portion and a neck being attached to the center portion of the top surface, the lower attaching layer being made from a soft, flexible material;
 b) at least one shell having a top surface and a bottom surface, the at least one shell fitted on the top surface of the lower attaching layer, the at least one shell being made of a flexible material which is harder than the soft, flexible material of the lower attaching layer; and
 c) means for connecting the lower attaching layer to the at least one shell and for forcing the bottom surface of the at least one shell against the top surface of the lower attaching layer such that when the suction holder is attached to a mounting surface a pressure is created in the lower attaching layer in a direction opposite the neck, the connecting means including the at least one shell having a plurality of radial arms which engage one of a plurality of protuberances attached to an outer perimeter of the top surface of the lower attaching layer and a lip attached to an outer perimeter of the lower attaching layer.

26. The suction holder of claim 25 also comprising a hook member being attached to one of the neck and the at least one shell.

27. The suction holder of claim 26 wherein the hook member further includes a spring arm.

28. The suction holder of claim 25 wherein the at least one shell is polycarbonate.

29. The suction holder of claim 25 wherein a tab is attached to one of the at least one shell and the lower attaching layer.

30. The suction holder of claim 25 wherein the neck of the lower attaching layer extends through an opening in the at least one shell.

31. The suction holder of claim 25 wherein the at least one shell includes spring gripping section means for retaining an object between the spring gripping section means and the lower attaching top surface, the spring gripping section means being an integral segmented portion of the at least one shell.

32. The suction holder of claim 25 also comprising a lift tab attached to the spring gripping section means.

33. The suction holder of claim 25 wherein the soft, flexible material of the lower attaching layer has a durometer not greater than 75.

34. The suction holder of claim 25 wherein the lower attaching layer is made from a material with a durometer of less than 50.

35. The suction holder of claim 25 wherein the lower attaching layer is formed by calendar forming a sheet of the material having a durometer of less than 50; and stamping the lower attaching layer from the sheet of material having a durometer of less than 50.

36. The suction holder of claim 25 wherein the lower attaching layer material is polyvinyl chloride.

37. A suction holder comprising:
 a) a lower attaching layer having a bottom surface, a top surface with a center portion and a neck attached to the center portion of the top surface, the lower attaching layer being made from a soft, flexible material;
 b) a plurality of shells each having a top surface and a bottom surface, the plurality of shells being fitted onto the top surface of the lower attaching layer; and
 c) means for connecting the lower attaching layer to the plurality of shells and for forcing the plurality of shells against the top surface of the lower attaching layer such that when the suction holder is attached to a mounting surface a pressure is created in the lower attaching layer in the direction opposite the neck.

38. The suction holder of claim 37 wherein the neck of the lower attaching-layer extends through an opening in each of the plurality of shells.

39. The suction holder of claim 37 wherein the lower attaching layer and the plurality of shells are substantially flat.

40. The suction holder of claim 37 wherein the connecting means further comprises an elevated rim positioned on the bottom surface and along the circumference of at least one of the plurality of shells.

41. The suction holder of claim 37 wherein the connecting means includes at least two projections attached to the neck for retaining the plurality of shells in a desired position.

42. The suction holder of claim 37 wherein the connecting means includes annular rings positioned along an exterior surface of the neck.

43. A suction holder comprising:
a) a lower attaching layer having a bottom surface, a top surface with a center portion and a neck attached to the center portion of the top surface, the neck being an anchor stem, the lower attaching layer being made from a soft, flexible material;
b) at least one shell having a top surface and a bottom surface with a cavity, the at least one shell being fitted on the top surface of the lower attaching layer, the at least one shell being made of a flexible material which is harder than the soft, flexible material of the lower attaching layer; and
c) connecting mans for connecting the lower attaching layer to the at least one shell and for forcing the bottom surface of the at least one shell against the top surface of the lower attaching layer such that a pressure is created n the lower attaching layer in the direction opposite the neck when the suction holder is attached to a mounting surface, the connecting means comprising the anchor stem being friction fitted within the cavity positioned in the bottom surface of the at least one shell.

* * * * *

UNITED STATES PATENT AND TRADEMARK OFFICE
CERTIFICATE OF CORRECTION

PATENT NO. : 5,318,262

DATED : June 7, 1994

INVENTOR(S) : WILLIAM E. ADAMS

It is certified that error appears in the above-indentified patent and that said Letters Patent is hereby corrected as shown below:

Column 12, line 13, change "n" to --in--.

Signed and Sealed this

Twenty-fifth Day of October, 1994

Attest:

BRUCE LEHMAN

Attesting Officer

Commissioner of Patents and Trademarks